United States Patent [19]

Mooney et al.

[11] Patent Number: 5,085,228
[45] Date of Patent: Feb. 4, 1992

[54] STARCH BASED NATURAL ADHESIVES USED IN CIGARETTE MANUFACTURE

[75] Inventors: Neil T. Mooney; Judith M. Liddle; Wayne C. Wright, all of Slough; Geoffrey Smith, Urmston, all of England

[73] Assignee: National Starch and Chemical Investment Holding Corporation, Wilmington, Del.

[21] Appl. No.: 526,205

[22] Filed: May 21, 1990

[51] Int. Cl.$^5$ .............................................. A24C 5/24
[52] U.S. Cl. ...................................... 131/37; 131/69; 131/90
[58] Field of Search .................. 131/69, 90, 359, 369, 131/355, 360, 361, 365, 367; 106/210

[56] References Cited

FOREIGN PATENT DOCUMENTS 57-11579 3/1982 Japan .

OTHER PUBLICATIONS

H. M. Kennedy, "Starch and Dextrin in Prepared Adhesives", *Starch: Chemistry and Technology*, second edition, 1984, pp. 593-610.

*Primary Examiner*—V. Millin
*Attorney, Agent, or Firm*—Eugene Zagarella, Jr.; Edwin M. Szala

[57] ABSTRACT

An adhesive for use in cigarette manufacturing which is a natural based starch material having excellent flow or fluidity characteristics and viscosity stability and comprising a mixture of crosslinked starch and a fluidity or converted starch, particularly an acid converted starch, the starches having an amylopectin content of at least 70% by weight and prepared by cooking at high temperature and pressure.

19 Claims, No Drawings

STARCH BASED NATURAL ADHESIVES USED IN CIGARETTE MANUFACTURE

BACKGROUND OF THE INVENTION

The present invention is directed to the use of selected modified starches, prepared by cooking at high temperature and pressure, as natural adhesives in the manufacture of cigarettes.

Cigarettes are generally comprised of a cigarette rod and most often a filter or plug. The cigarette rod consists of a stream of tobacco wrapped in a paper tube, the paper tube being glued along one longitudinal edge with a suitable adhesive (side seam or lap seal). The filter or filter plug generally consists of a crimped textile tow of cellulose acetate fibers treated with a plasticizer and wrapped into a cylindrical form with paper. The center of the paper is attached to the fibers using an adhesive (centerline adhesive) and the paper is then wrapped around the plug rod, overlapping and attaching itself with an adhesive (overlap adhesive) to form the cylindrical filter plug. The filter or plug is then attached to the cigarette rod by wrapping another paper (tipping paper) which contains an adhesive (tipping adhesive) around the plug and overlapping it with an aligned rod.

Most cigarette manufacturing processes involve high speed operations (2000-12000 cigarettes per minute) where the adhesive is typically applied by nozzle (side seaming, center-line and overlap), paste wheel (side seaming) and by rollers (filter tipping). Adhesives used in these operations are generally synthetic emulsions but because of increasing interest and tobacco regulation requirements in different countries, natural type adhesives are being sought to replace the synthetics.

Starch has long been used as an adhesive material in various applications such as case and carton sealing, laminating, tube winding, papermaking, etc., as described in *Starch: Chemistry and Technology*, second edition by R. Whistler, J. Bemiller and E. Paschall, 1984, pp. 593-610. Dextrins and thin-boiling starches are disclosed as useful as side seam adhesives but generally at lower solids than being required at current high speed manufacturing operations.

The cooking of starch at high temperature and pressure in continuous operations is well known as disclosed in Whistler noted above. One such method disclosed in Japanese Patent No. 57-11579, published Mar. 5, 1982, involves continuous adhesive manufacturing of natural or synthetic adhesive materials using high pressure heating and forced stirring.

Despite continued developments and improvements for adhesive properties and technological advances in the manufacturing techniques for producing adhesives, there still is the need for a natural adhesive material which will satisfy the requirements of current cigarette production. This has not been easy to accomplish particularly because of the demanding high speed operation and the required properties that adhesive materials used in these operations must possess including flow or fluidity, drying speed, cohesiveness, bonding strength, viscosity stability, machinability and other rheological characteristics.

SUMMARY OF THE INVENTION

This invention relates to an adhesive for use in cigarette manufacturing which is a natural based starch material having excellent flow or fluidity characteristics as well as viscosity stability and other need rheological properties. This adhesive comprises a selected stabilized starch composition which contains a mixture of a crosslinked starch and a fluidity or converted starch, the starches having an amylopectin content of at least 70% by weight and prepared by cooking at high temperatures and pressure, said adhesive having a solids content of about 10 to 60% and a Brookfield viscosity of about 500 to 20,000 cps at 22.5° C.

More particularly, this invention is directed to an adhesive for use in cigarette manufacturing comprising a starch composition which is a mixture of a crosslinked starch with an acid-converted starch, the starches having an amylopectin content of at least 70% by weight and prepared by cooking at a temperature of at least 100° C. using high pressure of at least 30 psi, preferably jet cooking using steam injection, the starch adhesive having a solids content of about 10 to 60%, preferably 20 to 40, and a Brookfield viscosity of about 500 to 20,000 cps, preferably 800 to 5,000 at 22.5° C.

This invention also involves the method of manufacturing cigarettes wherein the natural adhesive starch composition, defined above, is used as the adhesive particularly in the side seaming and filter tipping operations.

DETAILED DESCRIPTION OF THE INVENTION

The starch composition prepared and used as an adhesive in cigarette manufacturing in accordance with this invention must satisfy the demands and requirements of high speed operations, typically greater than 6000 cigarettes per minute. In order to accomplish this, a composition having a particular starch composition and method of preparation has been found.

The starch composition used in this invention includes a mixture or blend of selected modified starches, the starches having an amylopectin content of at lest 70%, and preferably at least 75%, by weight. Starches of this type include waxy maize, waxy rice, tapioca, potato, maize (corn), wheat, arrowroot and sago. Preferred are waxy and root starches, especially waxy maize, tapioca and potato.

More particularly, the starch composition used in this invention is a mixture of a crosslinked starch with a fluidity or converted starch and derivatives thereof. The crosslinked starch is obtained by treatment with a multifunctional reagent in accordance with known conventional practice. Suitable crossinking agents include mixed anhydrides of acetic and di- or tribasic acids, epichlorohydrin, phosphorous oxychloride, sodium metaphosphate and di- or polyepoxides with the mixed anhydrides being preferred. The degree of crosslinking may be varied depending on desired properties and conditions of cooking with light and moderate crosslinking typically being applied. Generally, this means crosslinking with up to about 1.0% of a reagent based on the weight of starch, preferably up to about 0.2% and more preferably up to about 0.1%. More particularly croslinking will vary from about 0.005 to 1% by weight of reagent based on the weight of starch and preferably from 0.005% to 0.2%, more preferably from about 0.01 to 0.1%.

The fluidity or converted starches are typically starches which are acid converted, although other chemical conversions such as enzyme conversion and oxidation may also be used. These starches are generally identified by their fluidity or WF (water fluidity) number which is an inverse viscosity measurement or measure of the degree of degradation of the starch. The higher the fluidity number (WF), the more degraded the starch and the thinner the viscosity. The measurement for "water fluidity" (WF) as described herein is made using a Thomas Rotational Shear-Type Viscometer (manufactured by Arthur H. Thomas Co., Philadelphia, PA) in accordance with standard procedures such as disclosed in U.S. Pat. No. 4,499,116 issued Feb. 12, 1985 to Zwiercan, et al. Useful acid-converted starches will have a water fluidity (WF) of from about 40 to 90, preferably from abut 50 to 90 and more preferably from about 60 to 85. Preparation of acid-converted starches follows conventional techniques where the starch base is treated with an acid, such as hydrochloric or sulfuric acid at a temperature, e.g., 20 to 55° C. for the length of time required to obtain the thinned starch that is sought.

The selected starches, i.e., crosslinked and acid converted, may be further modified to provide desired viscosity and flow properties as well as tack, stability and other physical and rheological properties necessary to satisfy the demands of high speed cigarette production as well as the high temperature, high pressure process by which the adhesives are prepared. Such modifications, include derivatized starches prepared by processes known in the art, e.g., etherification, esterification and oxidation. Particularly useful modifications of the starches of this invention are the hydroxyalkyl starches prepared by the etherification with alkylene oxides such as those containing 2 to 6, preferably 2 to 4 carbon atoms and especially ethylene and propylene oxide. Varying amounts of such compounds may be used depending on the properties desired with up to about 15%, and preferably up to about 10%, by weight, based on the weight of starch, generally being used.

Generally the blend or mixture of starches used can be varied and more particularly will comprise from about 0.2:1 to 4:1 parts of the crosslinked starch to the acid converted starch by weight and preferably from about 0.5:1 to 3:1.

Preferred starches are the crosslinked waxy starches, especially those crosslinked with mixed acetic anhydride-adipic acid and the hydroxy propylated starches, especially the acid converted starches such as tapioca. While the crosslinked starch, as described above, may be used alone, mixtures with a fluidity or acid-converted starch are preferred.

The above described starch conversions and modifications, including crosslinking, acid conversion and etherification as well as other similar procedures are well known to those skilled in the art and described in publications such as *Handbook of Water-Soluble Gums and Resins*, Robert L. Davidson (Editor), Chapter 22: "Starch and its Modifications" by M. W. Rutenberg, 1980 and in *Starch Chemistry and Technology*, Second Edition, edited by R. L. Whister, et al., Chapters X and XVII, 1984.

While various thermal processes have been used in preparing starches, in order to prepare the starch adhesives of this invention having the required property characteristics, it is necessary to use a particular thermal cooking process involving a high temperature, high pressure cooking operation. An advantageous and preferred method involves the use of a thermomechanical conversion or jet cooking operation wherein the starch is cooked at high pressure with an excess of steam via steam injection to a temperature high enough to thoroughly disperse and cook the starch. Typically a slurry of starch is pumped through a heater where high-pressure steam is injected to raise the temperature and impart mechanical shear to the paste. While under pressure, the hot paste enters a retention chamber or coil to maintaining the high temperature for a time period varying, depending on the design of the equipment, from several seconds to several minutes. Using a backpressure valve, the paste is flashed at atmospheric pressure, producing high turbulence and shear. Excess steam is separated and the product is collected.

The conditions used in preparing the starches are by cooking at high temperature and pressure, i.e., a temperature of at least 100° C., more particularly from about 120 to 220° C. and pressure of greater than about 30 psi (0.21 MPa) and more particularly from about 50 to 220 psi (0.34 to 1.52 MPa) and above.

The preferred conditions employed in preparing the starches are by jet cooking at temperatures of at least 100° C., more particularly from about 120 to 220° C. and preferably from about 140 to 180° C., and pressures of greater than 100 psi (0.69 MPa), more particularly from about 120 to 200 psi (0.83 to 1.38 MPa) and above and preferably from about 140 to 180 psi (0.96 to 1.24 MPa). While variations in the properties of the prepared adhesives will result by changing temperature and pressure conditions and controlling the excess steam, additional property variations can be obtained by using agents such as oxidizing agents. Particularly useful oxidizing agents are sodium perborate and ammonium persulfate.

The selected starch adhesives prepared as described above have properties making them particularly useful in manufacturing of cigarettes, especially those involved in high speed operations. These adhesives have a solids content of from about 10 to 60%, preferably from about 20 to 40% and a Brookfield viscosity of from about 500 to 20,000 cps at 22.5° C., preferably from about 800 to 5,000. The viscosity, as noted, is determined using a Brookfield viscometer at 20 rpm and 22.5° C. The adhesives also have a pH of from about 3 to 9, preferably from about 5 to 7. Another important attribute of the adhesives of this invention is that the are viscosity stable, i.e., they said retrogradation and retain their original viscosity to a reasonable degree (i.e., within 10–20%) for a period of at least one month and preferably two or more months. This characteristic gives the adhesives the flexibility needed in satisfying cigarette manufacturing operations.

Several operations are involved in the manufacture of cigarettes as described previously and each of them involves the use of an adhesive. Typically, different adhesives are used in the different manufacturing and assembling steps because of the different property requirements and especially in view of the currently increased production speeds, e.g., greater than 6,000 cigarettes per minute. The starch adhesives prepared in accordance with this invention may be used in any of the cigarette manufacturing steps. They have been found especially useful in the side seaming operations involved in preparing the cigarette rod where the tobacco is wrapped in overlapping paper and in filter tipping where the filter or plug is attached or joined to the cigarette rod by an overlapping paper which longitudinally extends over the filter tip and part of the rod. They also may be used in the formation of the filter plug as a centerline adhesive where the fibers are attached to the paper and as an overlap adhesive where the paper is wrapped around the plug rod attaching to itself in an overlapping manner and forming the cylindrical filter plug.

The invention can be further illustrated by the following examples of preferred embodiments thereof, although it will be understood that these examples are merely for the purposes of illustration and are not intended to limit the scope of the invention. All percents and parts are by weight and temperatures are degrees celsius unless otherwise indicated. The viscosities of the adhesive were determined using a Brookfield viscometer at 20 rpm and 22.5° C.

EXAMPLE 1

An adhesive starch composition was prepared using a mixture of 24.5% hydroxypropylated tapioca starch (5% hydroxpropyl), 10.5% of waxy maize starch crosslinked with mixed acetic anhydride/adipic acid and 64.0% of water were added to a jet cooker along with 1.0% of sodium perborate. A preservative (blend of halogenated hydrocarbons), (0.5%) was post added to the cooled adhesive. The added material was cooked in a steam injected jet cooker at a temperature of 160 to 165° C., a pressure of about 150 psi and retained in the cooker for 45 seconds.

The prepared product had a solids content of 35%, a Brookfield viscosity of 900 cps at 22.5° C., was viscosity stable over two months and had good flow and tack properties.

EXAMPLE 2

Another adhesive starch composition was prepared in a manner similar to Example 1 using an equal mixture of hydroxypropylated tapioca starch (5% hydroxypropyl) and waxy maize starch crosslinked with mixed anhydride/adipic acid.

The prepared product had a solids content of 35%, a Brookfield viscosity of 3,400 centipoise at 22.5° C., was viscosity stable over several weeks and had good flow and tack properties.

EXAMPLE 3

In order to demonstrate the usefulness of the starch adhesive compositions in cigarette manufacturing, particularly high speed operations, the composition of Example 1 was tested on a Hauni Protos cigarette making machine as a side seaming adhesive. Runs were made which produced cigarette products at speeds of up to about 8,500 cigarettes per minute.

A similar test was made using the starch product of Example 2 and equally satisfactory results were attained at machine speeds of nearly 9,000 cigarettes per minute.

EXAMPLE 4

The commercial utilization of a starch adhesive having the composition of Example 2 was demonstrated further by its testing on a Hauni SE 80 Rodmaker. The machine's nozzle side seam applicator was modified by fitting a heated jacket around it. With a jacket temperature of 40-45° C. cigarettes were produced up to 10,000 cigarettes per minute, which was the machines capacity.

EXAMPLE 5

The starch adhesive composition prepared in Example 2 was tested on a Hauni Max 80 tipping machine to further demonstrate the usefulness of such compositions as tipping adhesives in cigarette manufacture. Acceptable cigarette products were made at speeds of up to about 6,500 cigarettes per minute.

What is claimed is:

1. An adhesive composition for use in cigarette manufacturing comprising a starch composition which is a mixture of a crosslinked starch with a fluidity or converted starch, said starches having an amylopectin content of at least 70% by weight, and said starch composition prepared by cooking said starch mixture at a temperature of at least 100° C. and pressure of at least 30 psi, the adhesive composition having a solids content of about 10 to 60% and a Brookfield viscosity of about 500 to 20,000 cps at 22.5° C.

2. The adhesive composition of claim 1, wherein the starches used in the composition are selected from the group consisting of waxy maize, waxy rice, tapioca, potato, maize, wheat, arrowroot and sago.

3. The adhesive composition of claim 2, wherein the fluidity starch is an acid converted starch having a fluidity of from about 40 to 90 WF.

4. The adhesive composition of claim 3, wherein the starch mixture is jet cooked at a temperature of from about 120 to 220° C. and a pressure of from about 120 to 200 psi.

5. The adhesive composition of claim 4, wherein the crosslinked starch is a starch modified with a mixed anhydride of acetic acid and di- or tribasic carboxylic acids.

6. The adhesive composition of claim 5, wherein the crosslinked starch is waxy maize.

7. The adhesive composition of claim 6 comprising a mixture of from about 0.2:1 to 4:1 parts by weight of crosslinked starch to acid converted starch.

8. The adhesive composition of claim 7 having a solids content of about 20 to 40% and a Brookfield viscosity of about 800 to 5000 cps at 22.5° C.

9. The adhesive composition of claim 8, wherein an oxidizing agent is used during the jet cooking operation and wherein the adhesive composition has a pH of about 3 to 9.

10. The adhesive composition of claim 9 comprising a mixture of a waxy maize starch crosslinked with mixed acetic anhydride/adipic acid and an hydroxypropylated acid converted tapioca starch.

11. In a method of manufacturing cigarettes the improvement comprising the use of an adhesive composition comprising a starch composition which is a mixture of a crosslinked starch with a fluidity or converted starch, said starches having an amylopectin content of at least 70% by weight, and said starch composition prepared by cooking said starch mixture at a temperature of at least 100° C. and pressure of at least 30 psi, the adhesive composition having a solids content of about 10 to 60% and a Brookfield viscosity of about 500 to 20,000 cps at 22.5° C. as the adhesive.

12. The method of claim 11, wherein the adhesive is used as the side seaming adhesive.

13. The method of claim 11, wherein the adhesive is used as the filter tipping adhesive.

14. The method of claim 11 wherein the starch mixture is crosslinked waxy maize and a hydroxypropylated acid converted tapioca starch.

15. The method of claim 11, wherein the adhesive is used as the side seaming adhesive.

16. The method of claim 11, wherein the adhesive is used as the filter tipping adhesive.

17. In a method of manufacturing cigarettes the improvement comprising the use of an adhesive composition comprising a starch composition which is a mixture of a crosslinked starch with a fluidity starch which is an acid converted starch having a fluidity of from about 40 to 90 WF, said starches having an amylopectin content of at lest 70% by weight, and said starch composition prepared by jet cooking said starch mixture at a temperature of from about 120 to 220° C. and a pressure of from about 120 to 220 psi, the adhesive composition having a solids content of about 10 to 60% and a Brookfield viscosity of about 500 to 20,000 cps at 22.5° C. as the adhesive.

18. The method of claim 17, wherein the adhesive is used as the side seaming adhesive.

19. The method of claim 17, wherein the adhesive is used as the filter tipping adhesive.

* * * * *